(12) United States Patent
Sukumar

(10) Patent No.: US 10,737,629 B2
(45) Date of Patent: Aug. 11, 2020

(54) GLOVE BOX FOR A VEHICLE HAVING A FLEXIBLE DIVIDER

(71) Applicant: GM GLOBAL TECHNOLOGY OPERATIONS LLC, Detroit, MI (US)

(72) Inventor: Nithish Sukumar, Tamil Nadu (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 99 days.

(21) Appl. No.: 16/169,026

(22) Filed: Oct. 24, 2018

(65) Prior Publication Data

US 2020/0130593 A1     Apr. 30, 2020

(51) Int. Cl.
*B60R 7/06* (2006.01)
*B65D 25/04* (2006.01)

(52) U.S. Cl.
CPC ............... *B60R 7/06* (2013.01); *B65D 25/04* (2013.01)

(58) Field of Classification Search
CPC .................................. B60R 7/06; B65D 25/04
See application file for complete search history.

(56) References Cited

U.S. PATENT DOCUMENTS

| 5,890,755 | A | 4/1999 | Speelman et al. |
| 6,231,099 | B1 | 5/2001 | Greenwald |
| 6,715,815 | B2 | 4/2004 | Toppani |
| 7,431,369 | B2 | 10/2008 | Park |
| 2011/0220705 | A1* | 9/2011 | Acevedo ................... B60R 7/04 229/67.3 |

* cited by examiner

*Primary Examiner* — D Glenn Dayoan
*Assistant Examiner* — Melissa Ann Bonifazi

(57) ABSTRACT

A glove box for a vehicle includes a glove box door pivotally hinged to an instrument panel in a vehicle, a pair of side walls extending rearwardly from the glove box door, a rear wall connected to rearward edges of the pair of side walls. The glove box door, the pair of side walls, and the rear wall define a storage volume between them. The glove box further includes a flexible divider pivotally hinged at a lower portion of the storage volume.

13 Claims, 4 Drawing Sheets

GLOVE BOX FOR A VEHICLE HAVING A FLEXIBLE DIVIDER

FIELD

The present disclosure relates to a glove box for a vehicle having a flexible divider.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

It is well known to provide a glove box that provides a closable storage volume in the instrument panel of a vehicle. A glove box is typically fitted to an opening in the instrument panel and generally includes a glove box door which is pivotally openable relative to the instrument panel. In a closed position, the glove box closes the opening and is generally flush with the instrument panel.

As a result of normal motions of the vehicle, items stored within the glove box tend to become mixed with one another with the smaller and heavier items migrating to the lowermost point or rattling throughout the glove box. Items may be difficult to locate and upon retrieval may cause inadvertent removal of other items. Further, items stored in the glove box which may be particularly sensitive may be at risk of breaking due to movement around within the glove box as the vehicle moves.

SUMMARY

In an exemplary aspect, a glove box for a vehicle includes a glove box door pivotally hinged to an instrument panel in a vehicle, a pair of side walls extending rearwardly from the glove box door, a rear wall connected to rearward edges of the pair of side walls. The glove box door, the pair of side walls, and the rear wall define a storage volume between them. The glove box further includes a flexible divider pivotally hinged at a lower portion of the storage volume.

In this manner, the glove box is capable of securely holding an object within the glove box thereby preventing or minimizing vibration and/or damage to the object.

In another exemplary aspect, the flexible divider is pivotally hinged by a laterally extending hinge in the lower portion of the storage volume.

In another exemplary aspect, the laterally extending hinge is positioned adjacent a lower edge of the glove box door.

In another exemplary aspect, the flexible divider is pivotal between a first position adjacent the rear wall and a second position adjacent the glove box door.

In another exemplary aspect, the flexible divider includes a frame defining an outer peripheral extent of the divider, and a flexible material stretched between opposing sides of the frame.

In another exemplary aspect, the frame includes an upwardly extending projection.

In another exemplary aspect, the glove box further includes a latch system in a frame of the instrument panel for selectively securing the flexible divider.

In another exemplary aspect, the latch system includes a slider in a frame of the instrument panel.

In another exemplary aspect, the slider is selectively slidable in a lateral direction to selectively secure the flexible divider.

In another exemplary aspect, the latch system further includes an arm pivotally extending from the frame of the instrument panel in a downward direction.

In another exemplary aspect, the arm is responsive to the slider moving in a lateral direction to pivot between a latching position and an unlatching position.

In another exemplary aspect, the arm includes a downwardly extending leg portion.

In another exemplary aspect, the arm further includes a hook portion at a distal end of the leg portion.

In another exemplary aspect, the divider includes an upwardly extending projection and wherein the hook portion is configured to selective capture the projection to selectively secure the divider in a position.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
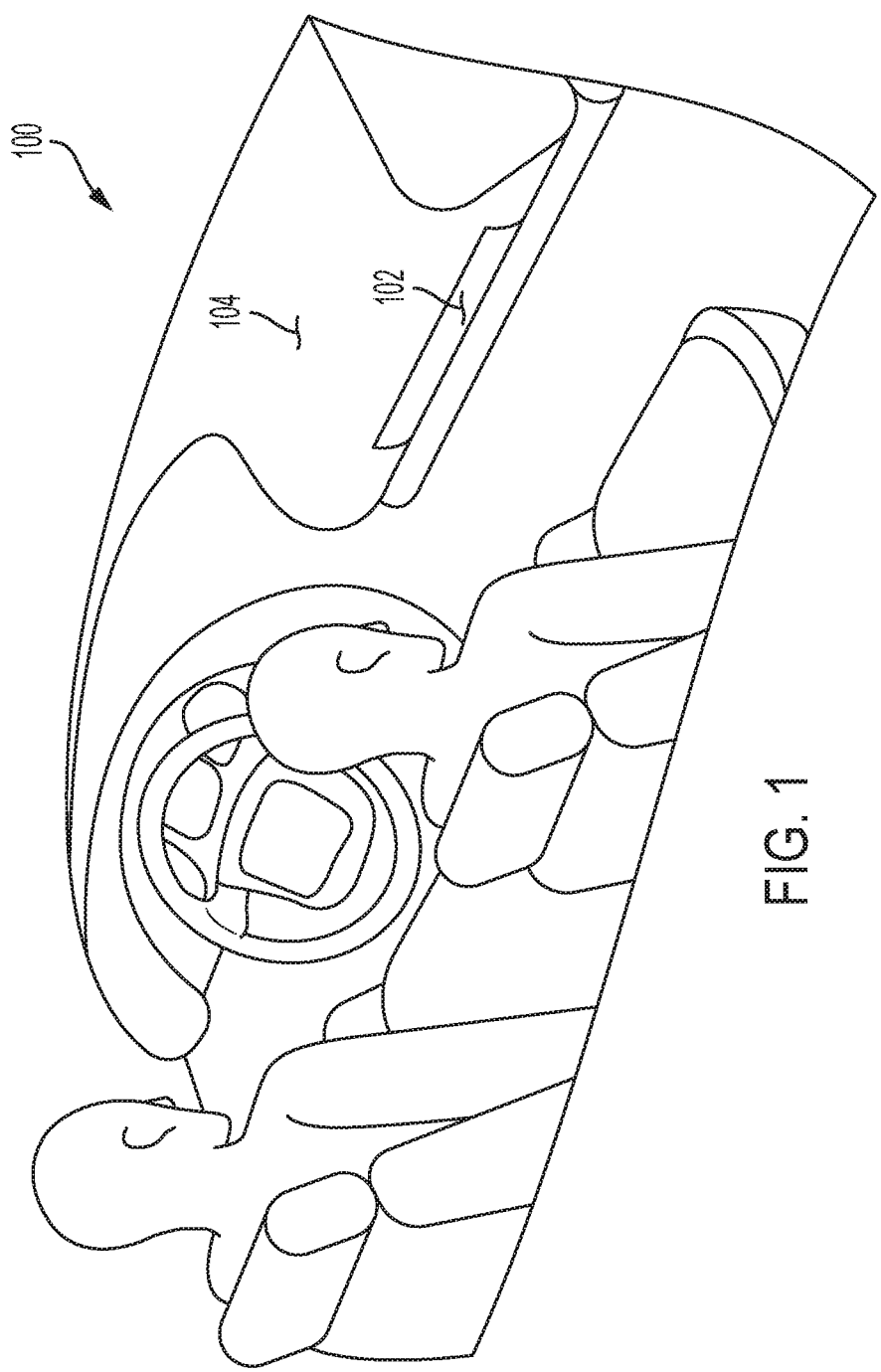
FIG. 1 is a perspective view of a vehicle interior including a glove box mounted on an instrument panel.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 1 is a perspective view of a vehicle interior 100 including a glove box 102 mounted on an instrument panel 104. The glove box 102 is preferably mounted forward of a passenger side of the vehicle in the instrument panel 104.

Figure 2:
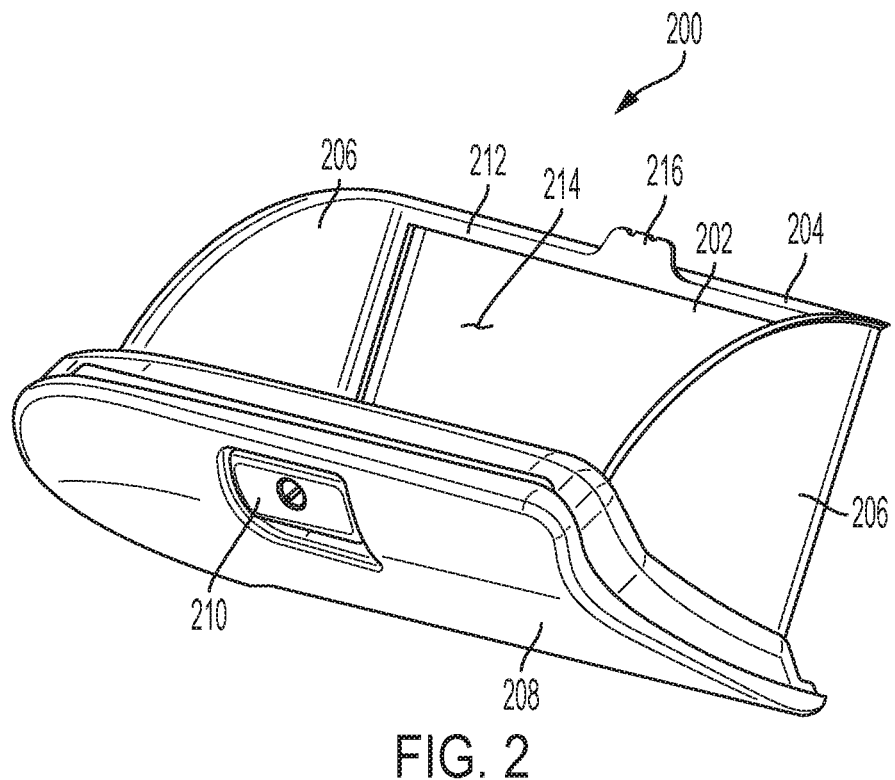
FIG. 2 is a perspective view of an exemplary embodiment of a glove box having a flexible divider in a first position in accordance with the present disclosure.
Figure 3:
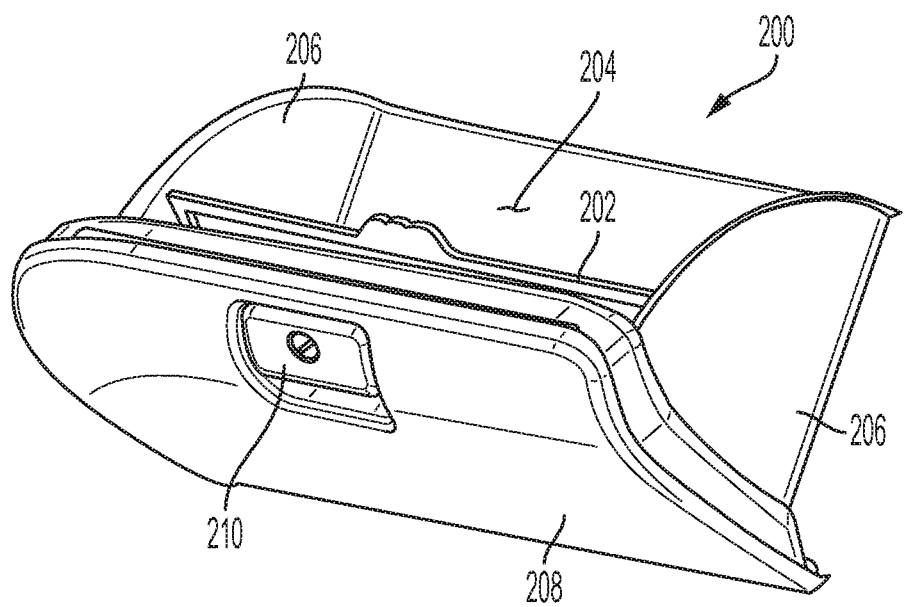
FIG. 3 is another perspective view of the exemplary glove box of FIG. 2 with the flexible divider in a second position.

Referring now to FIGS. 2 and 3, perspective views of an exemplary embodiment of a glove box 200 having a flexible divider 202 in a first position in FIG. 2 and in a second position in FIG. 3 in accordance with the present disclosure. The glove box 200 further includes a rear wall 204, side walls 206, and a forward facing door 208 that includes a latch 210. The flexible divider 202 includes a frame 212 extending around the outer periphery of the divider 202 and a flexible material 214 stretchably extending between sides of the frame. In a preferred embodiment, the flexible material 214 may stretchably extend between all side of the frame, however, it is to be understood that the flexible material 214 may stretch between any number of sides of the frame without limitation.

Figure 4:
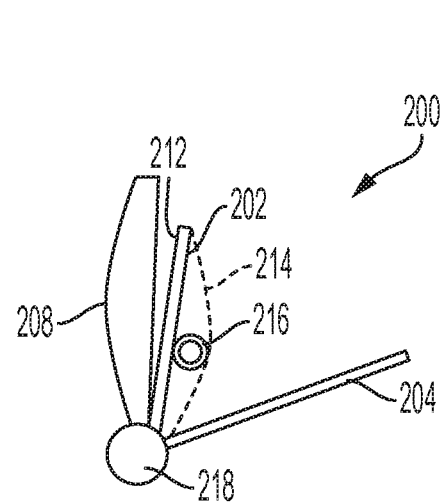
FIG. 4 is a cross-sectional view of an exemplary embodiment of a glove box having a flexible divider in a second position in accordance with the present disclosure.
Figure 5:
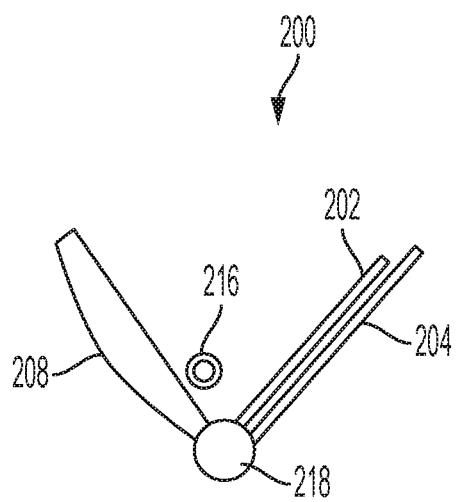
FIG. 5 is a cross-sectional view of the exemplary glove box of FIG. 4 with the flexible divider in a first position.

Preferably, the frame 212 may further include a projection 216 which may engage a latch system which will be described below. The flexible divider 202 is pivotally rotatable between a first position adjacent the rear wall 204 as shown in FIG. 5 and a second position adjacent the door 208 as shown in FIG. 4. The flexible material 214 may be formed of a stretchable film that is made of a relatively soft and flexible material.

In an exemplary embodiment, the hinge 218 may incorporate a torsional spring (not shown) which rotatably biases the divider 202 toward the first position illustrated in FIG. 5. In this manner, when the divider 202 is released from latch system (described below) the divider 202 will return to the first position.

Figure 6:
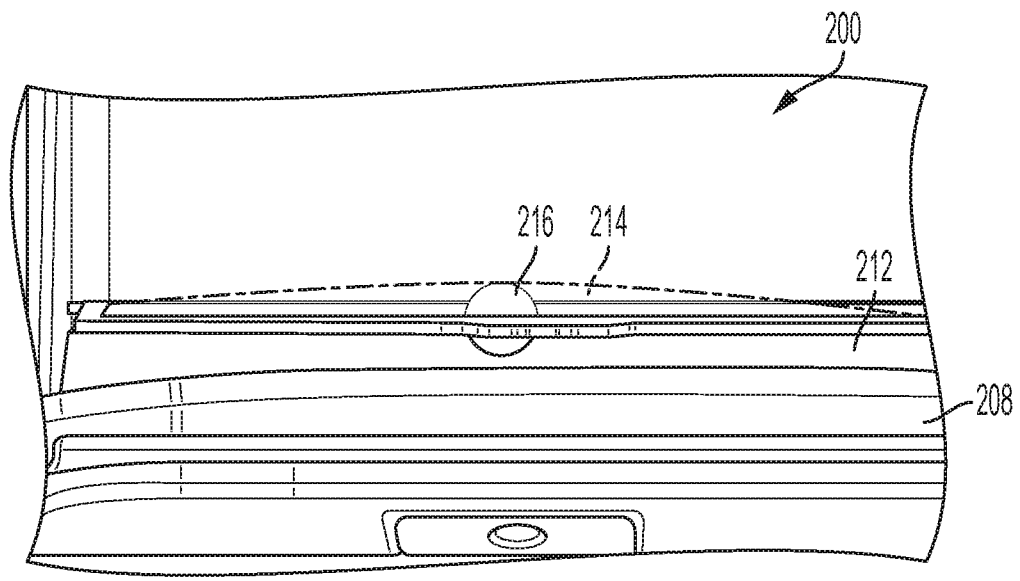
FIG. 6 is a close up perspective view of an exemplary embodiment of a glove box having a flexible divider securely holding an object.

FIGS. 4 and 5 provide cross-sectional views of an exemplary embodiment of a glove box 200 having a flexible divider in a first position in FIG. 5 and a second position in FIG. 4. The flexible divider 202 is positioned in the first position adjacent the rear wall 204 of the glove box 200 in FIG. 5 and is positioned in a second position adjacent the door 208 in FIG. 4. An object 216 is positioned inside the glove box while the divider 202 is positioned adjacent the rear wall 204 in FIG. 5. In this configuration, the object 216 is free to move within the glove box 200 and normal motion of the vehicle may risk damage to the object 216 and vibration and noise due to the object 216 rattling around within the glove box 200 due to vibrations of the vehicle. The divider 202 is pivotally attached to the glove box 200 with a hinge 218 adjacent a lower portion of the glove box 200. Pivoting of the divider 202 from the first position to the second position captures the object 216 between the flexible material 214 of the divider 202 and the door 208. Due to the elastic and flexible nature of the flexible material 214 the object 216 is securably held against the door 208. In this manner, the divider 202 prevents the object 216 from vibrating and moving around freely within the glove box 200 reducing noise and protecting the object 216 from being damaged. FIG. 6 provides a close up perspective view looking downward into the glove box 200. FIG. 6 more clearly illustrates the flexible material 214 elastically deforming to firmly hold the object 216 against the door 208.

Figure 7:
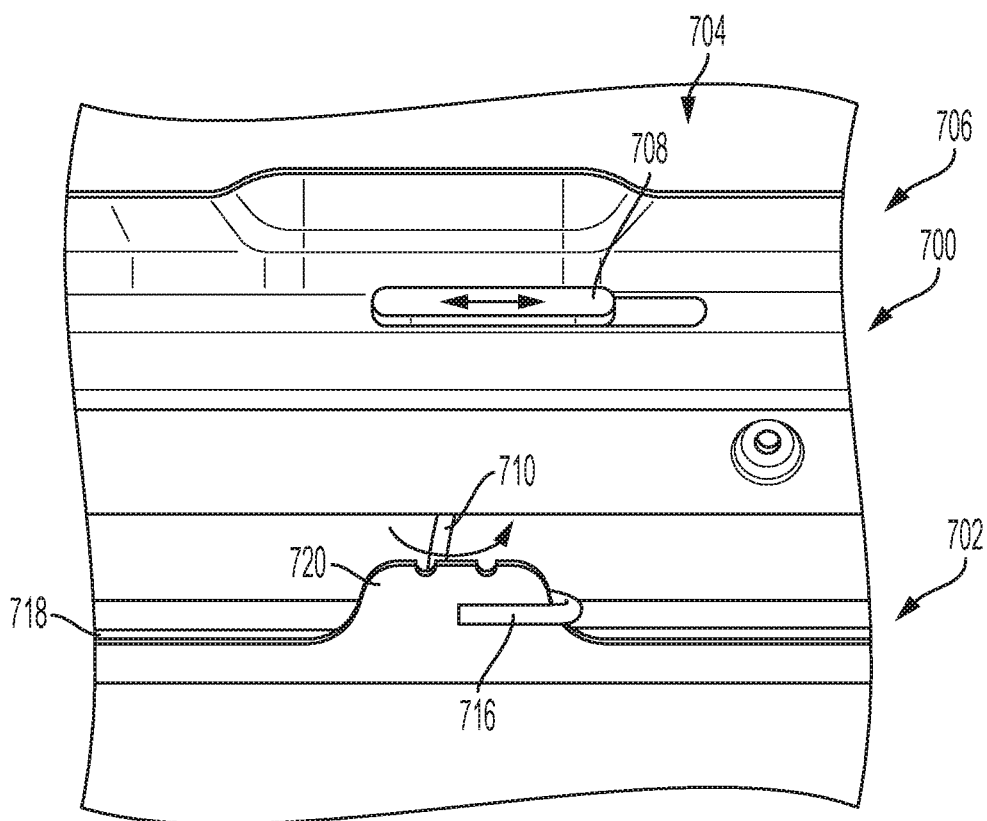
FIG. 7 is a close up perspective view of an exemplary embodiment of a glove box having a flexible divider and a latch system.
Figure 8:
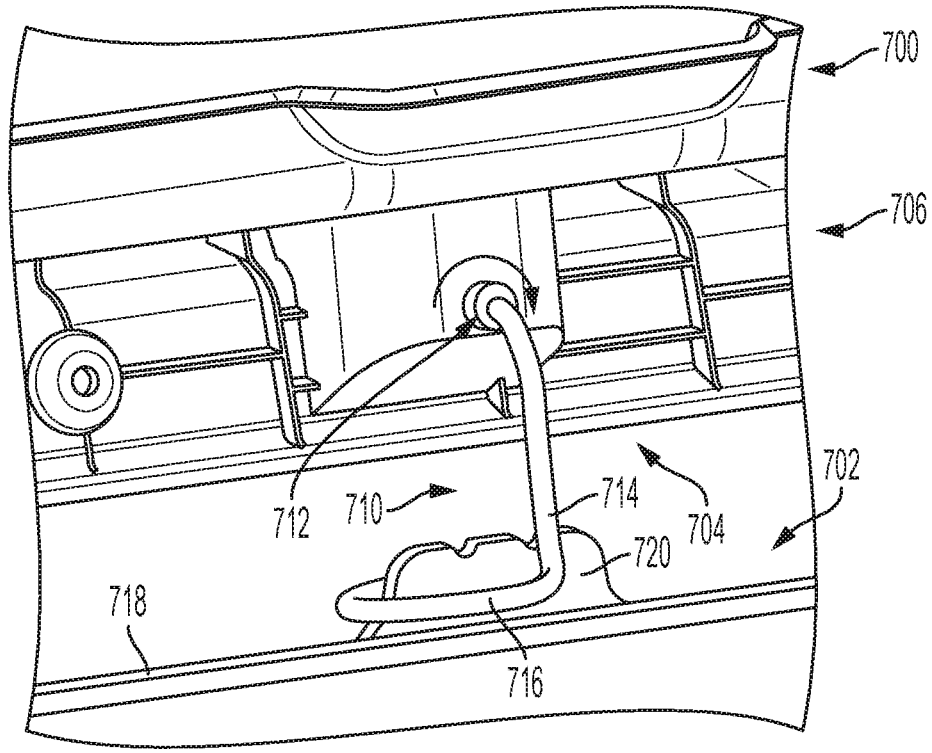
FIG. 8 is another close up perspective view of the glove box of FIG. 7.

FIG. 7 provides a close up perspective view of an exemplary embodiment of a glove box 700 having a flexible divider 702 and a latch system 704 in a frame 706 of an instrument panel of the vehicle. The latch system 704 operates to selectively engage with the flexible divider 702 to securely hold the divider 702 in a position that is fixed relative to the frame 706. The latch system 704 includes a slider 708 which, when operated, causes an arm 710 to rotate about pivot 712. The arm 710 includes a leg portion 714 that is pivotally connected at a proximal end at the pivot 712 and includes a hook portion 716 at a distal end of the leg portion of the arm 710. The hook portion 716 is configured to capture a portion of a frame 718 of the divider 702. In the embodiment of FIGS. 7 and 8, the hook portion 716 selectively engages with a projection 720 extending upward from the frame 718 of the divider 702. In this manner, an object may be positioned within the glove box 700, between the divider 702 and the door of the glove box (not shown). While the divider 702 is fixed to the frame 706 with the latch system 704 and when the glove box is closed the object is elastically captured the object between the flexible material of the divider 702 and the door. The latch system 704 may selective fix the divider in a position by selectively operating the slide 708 which rotates the arm 710 of the latch system 704 into a position where the hook portion 716 engages the projection 720 of the divider 702 thereby securing the divider 702 into a fixed position or by operating the slide 708 which pivotally rotates the arm 710 of the latch system 704 into a position where the hook portion 716 no longer engages the projection 720 of the divider, thereby releasing the divider 702 from being secured in a position. The divider 702 may then freely pivot within the glove box 700.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A glove box for a vehicle, the glove box comprising:
a glove box door pivotally hinged to an instrument panel in a vehicle;
a pair of side walls extending rearwardly from the glove box door;
a rear wall connected to rearward edges of the pair of side walls, wherein the glove box door, the pair of side walls, and the rear wall define a storage volume between them; and
a flexible divider pivotally hinged at a lower portion of the storage volume, wherein the flexible divider is pivotally hinged by a laterally extending hinge in the lower portion of the storage volume.

2. The glove box of claim 1, wherein the laterally extending hinge is positioned adjacent a lower edge of the glove box door.

3. The glove box of claim 1, wherein the flexible divider is pivotal between a first position adjacent the rear wall and a second position adjacent the glove box door.

4. The glove box of claim 1, wherein the flexible divider comprises:
a frame defining an outer peripheral extent of the divider; and
a flexible material stretched between opposing sides of the frame.

5. The glove box of claim 4, wherein the frame includes an upwardly extending projection.

6. The glove box of claim 1, further comprising a latch system in the glove box door for selectively securing the flexible divider in a position adjacent the glove box door.

7. The glove box of claim 6, wherein the latch system comprises a slider in a frame of an instrument panel of the vehicle.

8. The glove box of claim 7, wherein the slider is selectively slidable in a lateral direction to selectively secure the flexible divider in a fixed position relative to the frame of the instrument panel of the vehicle.

9. The glove box of claim 7, wherein the latch system further comprises an arm pivotally extending from the frame of the instrument panel in a downward direction.

10. The glove box of claim 9, wherein the arm is responsive to the slider moving in a lateral direction to pivot between a latching position and an unlatching position.

11. The glove box of claim 9, wherein the arm comprises a downwardly extending leg portion.

12. The glove box of claim 11, wherein the arm further comprises a hook portion at a distal end of the leg portion.

13. The glove box of claim 12, wherein the divider comprises an upwardly extending projection and wherein the hook portion is configured to selective capture the projection to selectively secure the divider.

\* \* \* \* \*